United States Patent
Mascolo

(10) Patent No.: US 7,130,268 B2
(45) Date of Patent: Oct. 31, 2006

(54) END-TO-END BANDWIDTH ESTIMATION FOR CONGESTION CONTROL IN PACKET SWITCHING NETWORKS

(76) Inventor: Saverio Mascolo, Stradella del Caffè, 8/a, 70124 Bari (IT)

(*) Notice: Subject to any disclaimer, the term of this patent is extended or adjusted under 35 U.S.C. 154(b) by 657 days.

(21) Appl. No.: 09/977,646

(22) Filed: Oct. 15, 2001

(65) Prior Publication Data
US 2002/0085587 A1 Jul. 4, 2002

Related U.S. Application Data

(60) Provisional application No. 60/240,855, filed on Oct. 17, 2000.

(51) Int. Cl.
*G08C 15/00* (2006.01)
(52) U.S. Cl. ............ 370/232; 370/233; 370/234; 370/235; 709/223; 709/224
(58) Field of Classification Search .......... 709/223, 709/225, 234, 235
See application file for complete search history.

(56) References Cited

U.S. PATENT DOCUMENTS 6,144,639 A * 11/2000 Zhao et al. ............ 370/235
6,493,316 B1 * 12/2002 Chapman et al. ...... 370/231
6,587,875 B1 * 7/2003 Ogus ..................... 709/223
2001/0044835 A1 * 11/2001 Schober et al. ........ 709/217

OTHER PUBLICATIONS

K. Lai and M. Baker, "Measuring Bandwidth," □□In Proceedings of the Conference on Computer Communications (IEEE Infocom), New York, Mar. 1999.□□.*
C. Albuquerque, B. J. Vickers, and T. Suda. An end-to-end source-adaptive multi-layered multicast (SAMM) algorithm. In Proceedings of the packet video workshop, PVW'99, Apr. 1999.□□□□.*
P. Sinha, N. Venkitaraman, R. Sivakumar, and V. Bharghavan, "WTCP: A Reliable Transport Protocol for Wireless Wide-Area Networks." ACM Mobicom '99, Seattle. WA. Aug. 1999.*

* cited by examiner

*Primary Examiner*—Bunjob Jaroenchonwanit
*Assistant Examiner*—Dohm Chankong
(74) *Attorney, Agent, or Firm*—Ladas & Parry LLP

(57) ABSTRACT

The invention herein described consists of an algorithm, which performs an end-to-end estimation of the bandwidth available in an end-to-end connection established between a server and a client via a packet switching network such as the Internet Protocol Network (IP). This algorithm is used to properly regulate the input rate at the send side. Typical applications are delivering best effort traffic over TCP, or audio and video traffic over RTP/UDP. The invention is particularly effective over wireless Internet and can be used in a content delivery system to dynamically choose the best server between a set of servers to satisfy the request of a client, or to select the best route in a content deliver or global hosting system.

7 Claims, 2 Drawing Sheets

END-TO-END BANDWIDTH ESTIMATION FOR CONGESTION CONTROL IN PACKET SWITCHING NETWORKS

This application is based on Provisional Application No. 60/240,855, filed Oct. 17 2000 in the United States of America. This application includes matter protected by copyright.

BACKGROUND OF THE INVENTION

1. Technical Field

This invention relates generally to efficient communication over packet switching networks. More particularly, the invention relates to a novel method for performing an end-to-end estimation of available bandwidth and a congestion control in packet networks such as the Internet. The invention addresses the issues of improving the efficiency in transferring data, audio and video over of the wireline and wireless Internet.

2. Description of the Related Art

The Internet Protocol connects all variety of different networks. An IP network implements a simple store-and-forward service. Over the IP network there are two transport protocol: the Transmission Control Protocol (TCP) and the User Datagram Protocol (UDP). The TCP is a sophisticated and complex protocol that offers a reliable, connection-oriented, end-to-end byte-stream service. It contains sophisticated algorithms of flow and congestion control in order to manage resource sharing and avoid congestion phenomena. Congestion control functions were introduced into the TCP in the late 1980s after the TCP/IP had become operational, and the network was suffering from congestion collapse. TCP congestion control has been introduced and described by V. Jacobson in his papers. Van Jacobson's seminal paper defines an additive increase/multiplicative decrease algorithm for throttling the size of the congestion window. The key idea is to probe the network capacity by increasing the load until packet loss is experienced. When a loss is experienced, the window size is reduced. More precisely, first cwnd is increased until packet losses are experienced and then it is rapidly decreased. The increasing process goes through two phases called slow start and congestion avoidance. During the slow start phase cwnd is exponentially increased until the slow start threshold (ssthresh) value is reached. This phase is intended to quickly grab available bandwidth. After the ssthresh value is reached, the cwnd is linearly increased to gently probe for extra available bandwidth. This phase is called congestion avoidance. At some point the TCP connection starts to lose packets. After a timeout is experienced, the window is drastically reduced to one and the slow start/congestion avoidance cycle repeats. This behavior is known as TCP Tahoe. Since during the slow start phase the network can be strongly underutilized, two other algorithms, called fast retransmit and fast recovery, were introduced to minimize the number of timeouts. The implementation of these algorithms provides what is currently called TCP Reno. Fast retransmit and fast recovery are both triggered after the sender receives three DUPACKs. The algorithm of fast retransmit sends again the packet that was acknowledged three times. The algorithm of fast recovery reduces the congestion window to half and enters into congestion avoidance phase. After a time out, the Congestion window is reduced to one.

Today TCP Reno is the more widely version employed. It is used in the leading Unix, Linux TCP protocol suite or in the Microsoft Windows TCP® protocol suite.

TCP was originally designed to provide reliable data delivery over conventional wireline networks for a limited range of transmission rates and propagation delays. Nowadays, communication paths with ever-larger bandwidth× delay product, wireless links, quality of service (QoS) requirements for interactive communication are all shifting the domain for which TCP was originally engineered.

We list here main modifications proposed for TCP Reno. TCP with selective acknowledgments (TCP SACK) introduces a more refined algorithm for acknowledging data TCP New Reno introduces a algorithm for recovering from many losses in a window of data.

A new congestion control algorithm is known as TCP Vegas. It throttles the congestion window based on the difference between the Actual Rate and the Expected rate. This algorithm has never been deployed in the TCP protocol suite of Microsoft or other commercial operating systems or in the Unix or Linux operating systems.

Today the TCP has a major performance problem over unreliable links such as wireless links that are often characterized by sporadic high-bit error rates, and intermittent connectivity due to handoffs. In fact, a loss due to an unreliable link is misinterpreted as a symptom of congestion by current TCP schemes and thus leads to an unnecessary shrinking of the control windows (i.e. the slow start and congestion window) with a consequent throughput reduction. It is well-know that TCP experiences a very low performance over wireless links such as in the GSM, GPRS, 3G, 4G, or UMTS systems. Analogously, it is also very well-known that TCP is not able to use the bandwidth of satellite links, which are characterized by large delays and random loss.

Recently, several schemes have been proposed to mitigate the negative effect on TCP performance of sporadic loss due to wireless links. These schemes can be classified into three groups: end-to-end proposals, split connection proposals and link layer proposal. End-to-end proposals aim at improving the performance of TCP using some form of selective acknowledgment (SACKs) to recover from multiple packet loss in a window of data. They also try to have the sender distinguish between loss due to congestion and other forms of losses using an Explicit Loss Notification (ELN) algorithm. Split connection approaches hide the wireless link by terminating the TCP connection at the base station. Such schemes use a separate connection between the base station and the destination host and can use techniques other than TCP to perform well over wireless links. Examples of these schemes are: Indirect TCP or Snoop protocol. Link layer proposals attempt to hide loss due to wireless links using local retransmissions and perhaps forward error correction over the wireless link. Examples of link layer protocols are forward error correction (FEC) and automatic repeat request (ARQ). Digital cellular systems, such as TDMA or CDMA, use ARQ protocols.

All solutions we have briefly described suffer serious drawbacks. In fact, in one case they violate the end-to-end paradigm, thus requiring complex implementation, or in the other case, they do not offer a remarkable throughput increment.

Another known problem of TCP is that it experiences a very low performance over connection with asymmetric bandwidth. These problems arise in several access networks, including bandwidth-asymmetric networks and packet radio subnetworks. In these cases, the TCP performance degrades significantly because of imperfection and variability in the ACK feedback from the receiver to the sender.

The present invention solves the problem of improving the fairness of TCP, the throughput of TCP over wireless connection and over connection with asymmetric bandwidth using an end-to-end approach. The present invention solves also other problems in real-time streaming of audio and video sources that are associated with prior art.

BRIEF SUMMARY OF THE INVENTION

It is a general object of the present invention to provide an end-to-end estimation of the bandwidth available in a client-server connection established over a packet switching network such as the Internet Protocol (IP) network. It is another object of the present invention to provide a method to perform congestion control in packet networks using this estimate.

The invention can be used within the Transmission Control protocol (TCP) to increase the utilization of network bandwidth. In particular it can be used to improve TCP performance over unreliable links such as wireless links in the Group Special Mobile (GSM), in the General Packet Radio Service (GPRS), in the 3G, 4G or Universal Mobile Telephone System (UMTS), and to increase the utilization of network bandwidth in the presence of connection with asymmetric bandwidth such as in the case of cable networks, (e.g. cable TV networks), direct broadcast satellite (e.g. an IP service using Digital Video Broadcast (DVB), with an interactive return channel), Very Small Aperture Satellite Terminals (VSAT), Asymmetric Digital Subscriber Line (ADSL), and several packet radio networks. These networks are increasingly being deployed as high-speed Internet access networks, and it is therefore highly desirable to achieve good TCP performance. The present invention also increases the fairness in bandwidth utilization.

The invention can be used over the User Datagram Protocol (UDP) to stream audio/voice using adaptive coding. With the term adaptive coding we mean that the quality of coding takes into account the estimate of the available bandwidth. An example is layered coding, in which the number of transmitted layers can be chosen by taking into account the estimate of available bandwidth.

The present invention can be used within an application conceived for real-time and running over the Real Time Protocol (RTP) that runs over the UDP protocol. The bandwidth estimate can be delivered from the receiver to the sender using the RTP Control Protocol.

The invention is based on obtaining samples of available bandwidth. When the invention is utilized for the TCP, samples are obtained at the sender side using the returning acknowledgment packets or at the receiver side using the arriving packets. Samples are continuously taken and are low-pass filtered. A filter with time-varying coefficients is used in order to obtain an estimate of available bandwidth. When samples of available bandwidth are computed at the receiver by considering the flow of arriving packets, and are filtered to obtain an estimate of the available bandwidth, then the bandwidth estimate is delivered to the sender using the Receiver Advertising Window field of the ACK packets. Estimation at the receiver is particularly suited for connections with asymmetric links.

The TCP sender utilizes the estimate to properly set congestion window and slow start threshold. In this way today's TCP blind reduction of the congestion window to half or to one after a congestion episode, i.e. after a timeout or 3 duplicate acknowledgments, is substituted by an adaptive setting of the congestion window and the slow start threshold. The adaptive setting takes into account the current estimate of the available bandwidth.

When the invention is used over the UDP protocol, the bandwidth estimate is performed at the receiver side and is sent back to the sender application using the RTP Control Protocol. The application at the sender utilizes the estimate to implement an adaptive coding for audio/video streaming that takes into account the estimate of the available bandwidth.

The foregoing has outlined some of the more pertinent features of the present invention. Other features and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DESCRIPTION OF THE PREFERRED EMBODIMENTD

Figure 1:
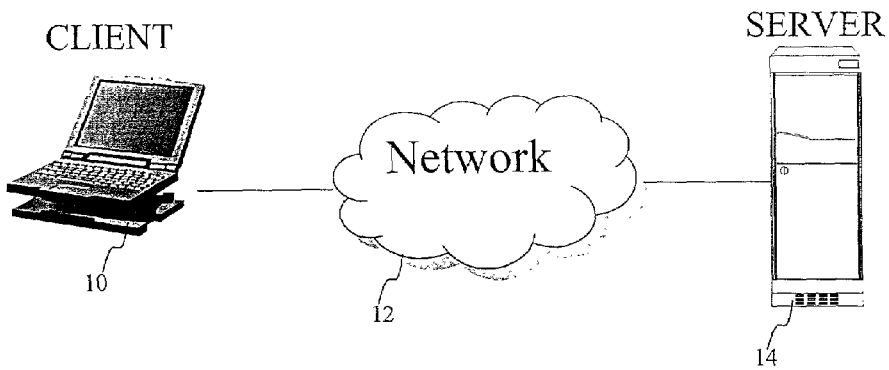
FIG. 1 is a representative system in which the present invention is implemented.

A known Internet client-server system is implemented as illustrated in FIG. 1. A client machine 10 is connected to a server machine 14 via a network 12. For illustrative purposes, network 12 is the Internet, an intranet an extranet, a satellite network or any other wireless or wired network. A server machine 14 is accessible by clients, one of which is illustrated by client machine 10. A representative server is a computer comprising a processor, an operating system such as Microsoft Windows®, IBM OS/2®, Sun Solaris®, Unix, Linux, a Web server program such as Netscape Enterprise server®, Apache®, Microsoft Internet Information Server®. The server also includes an Application Program Interface (API) that allows an application developer to extend or customize some parameters of the transport layers such as the size of the socket buffers. The server can include application programs for audio/video streaming. The server can be a mobile server. The server can be part of a Global Hosting System such as the one developed by Akamai Company and described in the U.S. Pat. No. 6,108,703.

A representative client machine is a personal computer based on a processor such as Pentium®, Motorola® or RISC® processor that includes an operating system such as Microsoft Windows®, IBM OS/2®, Sun Solaris®, Unix, Linux, a Web browser such as Microsoft Explorer® or Netscape Navigator® and application programs such as Real Networks® or Windows Media Player®. A client may also be a notebook computer, a PDA, a mobile client such as a cellular phone or any other device connectable to the computer network via a wired or wireless link such as a wireless local area network (WaveLAN), a HyperLan, Blutooth, GPRS, 3G, 4G or UMTS. The client-server connection can also be between mobile hosts such as cellular phones, or PDAs.

The present invention can be implemented in the TCP protocol suite of several operating systems such as Microsoft Windows TCP, Sun Solaris TCP, or it can be implemented in applications running over the RTP/UDP protocol. Examples of these ones are applications that are designed for audio/video streaming such as Real Networks® or Windows Media Player®. The present invention could be used in a Global Hosting System to dynamically choose the best server to satisfy the request of a client or to select the best route in a content delivery system such as the one described in the International Patent WO 00/38381 or in the U.S. Pat. No. 6,006,264 patent or in other similar patents.

Figure 2:
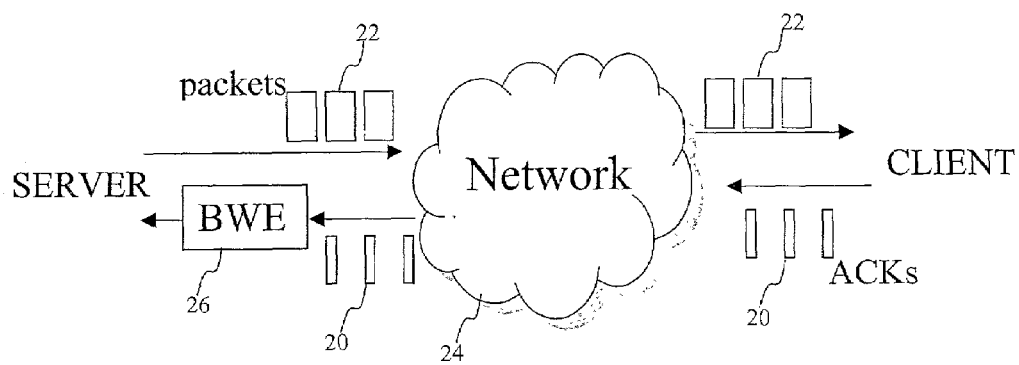
FIG. 2 is a representation of the bandwidth estimation algorithm implemented at the sender side of the connection.

FIG. 2 depicts the algorithm for performing the bandwidth estimation at the sender side of the connection. The flow of packets 22 goes from the sender to the receiver. The flow of acknowledgment packets (ACKs) goes from the receiver to the sender. This scheme, or other similar schemes that are based on a forward flow of data and on a backward flow of control data, is utilized for congestion control by protocol such as the TCP/IP protocol or the RTP Control Protocol or by other packet networks such as the Asynchronous Transfer Mode (ATM) networks. The flow of returning acknowledgment packets 20 are utilized by the routine 26 to compute samples of available bandwidth and compute an estimate of available bandwidth.

For sake of clarity we explain the algorithm implemented in routine 26 in the case of TCP/IP protocol. However it is clear the algorithm can be easily generalized to any other way of acknowledging packets (e.g. RM cells that are interleaved with data cells in ATM networks), the only difference being a proper counting of the number of packets that correspond to ACK packets.

In the case of the TCP protocol it is assumed that every packet is acknowledged or, if delayed acknowledgment is implemented, an ACK is sent every other packet. Therefore when an ACK packet reaches the sender it means that an amount of data corresponding to one packet has been delivered to the destination or an amount of data corresponding to two packets has been delivered if a cumulative ACK is received due to delayed ACK.

Notice that when a duplicate ACK reaches the source it counts for one packet. Therefore a cumulative ACK counts only for the amount of one packet since duplicate ACKs have been already taken into account. The only case when an ACK counts for two packets is when a cumulative ACK is received due to delayed ACK. Notice that if another algorithm of generating ACK packets is implemented, this particular algorithm must be considered to establish a correspondence between the ACK packets and the amount of data, i.e. packets, that have been delivered.

Each time the sender side receives an ACK at time $t_j$, a sample $b_j$ of available bandwidth is computed as follows:

$$b_j = \frac{d_j}{t_j - t_{j-1}}$$

where $t_{j-1}$ is the time the previous ACK was received and $d_j$ is the amount of data that have been acknowledged by the ACK.

Since congestion occurs whenever the low-frequency input traffic rate exceeds the link capacity, a low-pass filter is employed to average samples of available bandwidth and obtain the estimate of the available bandwidth. Notice that averaging is also critical to filter out "noise" due to delayed acknowledgements.

Thus, to obtain an estimate of the available bandwidth, the routine 26, which is represented in FIG. 2 by the block BWE, implements a discrete time low-pass filter. In particular we implement a low-pass filter with time-varying coefficients to counteract the fact that packet interarrival times are not constant. The implemented filter to obtain the bandwidth estimate (BWE) is the following:

$$\hat{b}_j = \frac{2\tau_f - \Delta_j}{2\tau_f + \Delta_j}\hat{b}_{j-1} + \Delta_j \frac{b_j + b_{j-1}}{2\tau_f + \Delta_j}$$

where $\hat{b}_j$ is the filtered measurement of the available bandwidth (i.e. the estimate BWE) at time $t=t_j$, $\Delta_j=t_j-t_{j-1}$, and $1/\tau_f$ is the cut-off frequency of the filter. A key feature of filter is that it contains time-varying coefficients.

The filter has a cut-off frequency equal to $1/\tau_f$. A typical value is $\tau_f=1$ sec. Since the ACK stream is asynchronous and cannot guarantee the constraint of the Nyquist sampling Theorem, we establish that if a time $\tau/m$ ($m \geq 2$) has elapsed since the last received ACK without receiving any new ACK, then the filter assumes the reception of a virtual sample $b_j=0$. Thus, in the persistent absence of ACKs since time $t=t_j$, the filter takes the form:

$$\hat{b}_{j+h} = \left(\frac{2m-1}{2m+1}\right)^h \hat{b}_j, h \geq 2$$

that is, in the persistent absence of ACKs, the estimated bandwidth geometrically goes to zero.

Figure 3:
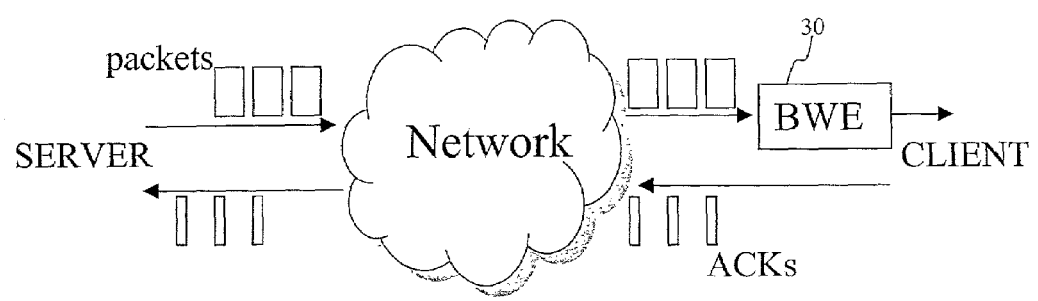
FIG. 3 is a representation of the bandwidth estimation algorithm implemented at the receiver side of the connection.

FIG. 3 depicts the case when the bandwidth estimation algorithm 30 is executed at the receiver side of the connection. In this case the receiver does not need to determine the amount of delivered data that corresponds to the ACK packets because the receiver directly knows the amount $d_j$ of received data. Therefore it can easily compute bandwidth samples and estimate the bandwidth using the low-pass filter described above in the present invention. The estimated bandwidth is sent to the sender using ACK packets. In the case of TCP, it can be used the Receiver Advertising Window field via the following setting:

Advertised_Window=min(Adverstised_Window, $RTT_{min} \times BWE$)

where $RTT_{min}$ is the minimum round trip time, that is, it is the round trip propagation time and the bandwidth estimate BWE is measured in packets/sec or bytes/sec.

The implementation of bandwidth estimation at the receiver is utilized in the presence of connections with asymmetric bandwidth, in which the bandwidth available for the backward flow of control cells is much smaller than the bandwidth of the forward path. This choice has the major advantage that bandwidth estimation is robust respect to losses of ACKs along the backward path. Moreover, to optimize the performance, the Receiver Socket buffer 46, see FIG. 4, must be not greater than the bandwidth of the link, which connects the client to the network, times $RTT_{min}$.

Figure 4:
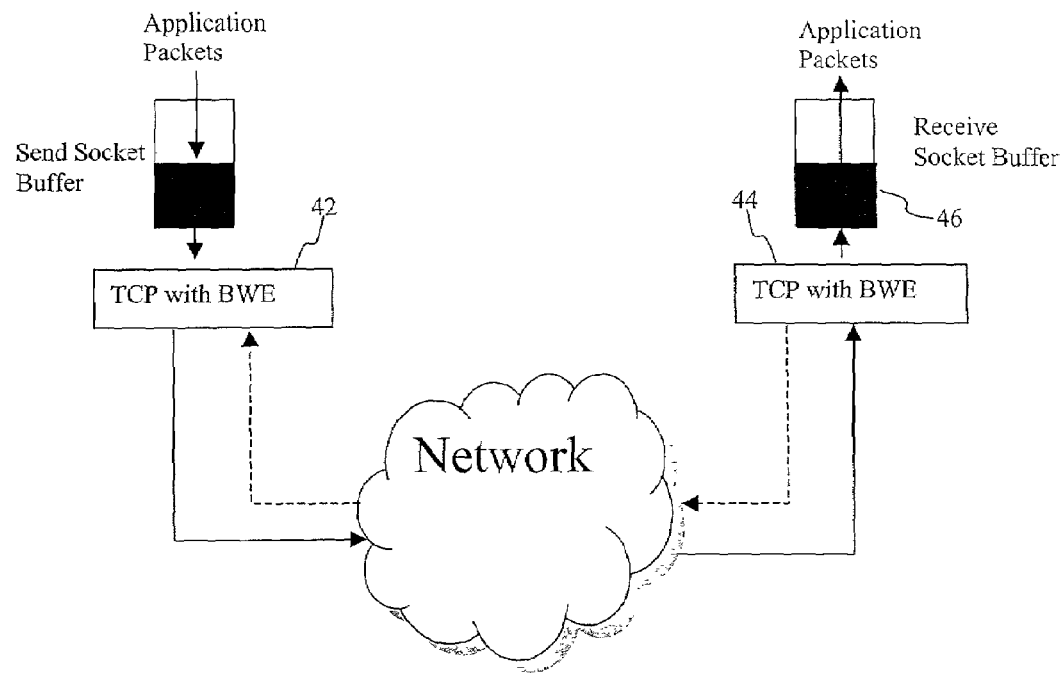
FIG. 4 is a representation of the bandwidth estimation algorithm implemented at the receiver or at the sender side of a TCP connection.

FIG. 4 shows the bandwidth estimation algorithm 42 implemented within the TCP protocol at the sender side or implemented at the receiver side 44.

Notice that when the bandwidth estimation algorithm is implemented at the sender side, it is triggered by reception of ACKs. In this case it is necessary to compute the amount of delivered data that corresponds to the ACK by considering the algorithm employed to generate the ACK (i.e. delayed ACK, selective ACK etc.) as described above. The pseudo-code of the algorithm is:

if (an ACK is received at time $t_j$)
compute the bandwidth sample $b_j$=(amount of data)/$(t_j-t_{j-1})$ compute an estimate $\hat{b}$ of the available bandwidth using the filter $$\hat{b}_j = \frac{2\tau_f - \Delta_j}{2\tau_f + \Delta_j}\hat{b}_{j-1} + \Delta_j\frac{b_j + b_{j-1}}{2\tau_f + \Delta_j}$$

endif

When the algorithm is implemented at the receiver side, it is triggered by the reception of packets. The pseudo-code of the algorithm is:

if (a packet is received at time $t_j$)
compute the bandwidth sample $b_j$=packet_size/$(t_j-t_{j-1})$ compute an estimate of the available bandwidth using the filter $$\hat{b}_j = \frac{2\tau_f - \Delta_j}{2\tau_f + \Delta_j}\hat{b}_{j-1} + \Delta_j\frac{b_j + b_{j-1}}{2\tau_f + \Delta_j}$$

endif

The algorithm for estimating the available bandwidth described in the present invention is used for setting the amount of data for unit of time that is injected by the sender.

In the case of TCP, the estimated bandwidth is used to set the congestion window and the slow start threshold after a congestion episode is experienced at the end of the TCP probing phase (called additive increase phase), that is, after a timeout or the reception of n (typically 3) duplicate acknowledgments. The rationale of this strategy is simple. TCP sets a slow start threshold and congestion window, which are related to the network capacity measured at the time congestion is experienced. In particular, this invention avoids the current TCP blind reduction of the congestion window to half or to one after congestion (which is called multiplicative decrease) by implementing an adaptive decrease that takes into account the bandwidth available at the time of congestion. The advantage of the proposed algorithm is that the TCP sender recovers faster after losses especially over connection with large round trip time or containing wireless links where sporadic losses are due to unreliable links and not to congestion. Simulation results have shown remarkable throughput increment up to 1200% in comparison with TCP Reno over wireless connection experiencing fading and blackouts.

The way the congestion window is increased during slow start phase and congestion avoidance phase can be left unchanged, that is it increases exponentially and linearly, as in current TCP Reno, to probe network capacity or it can be modified to take into account the bandwidth estimate.

The present invention utilizes the estimated bandwidth (BWE) to set the congestion window (cwnd) and the slow start threshold (ssthresh) after a congestion episode.

The general form of the algorithm after n (typically n=3) duplicate ACKs is described by the following pseudo-code:

```
after n duplicate ACKS
    if (cwnd>ssthresh) /* congestion avoidance phase */
        ssthresh= f₁ (BWE*RTTmin)
        cwin=ssthresh
    endif
    if (cwnd<ssthresh) /*slow start phase*/
        ssthresh= f₂ (BWE*RTTmin)
        if (cwnd > ssthresh)
            cwnd= ssthresh
        endif
    end if
```

The rationale of the algorithm is simple. When n DUPACKS are received, it means that we have hit network capacity. Thus the slow start threshold is set equal to the available pipe size, which is BWE*RTT$_{min}$. The congestion window is set equal to the ssthresh and the congestion avoidance phase is entered again for gently probing new available bandwidth. Function $f_1$ introduces one degree of freedom that can be used to tune the algorithm. Here we choose an identity function for $f_1$.

During slow start phase we are still probing for the available bandwidth. Therefore the BWE we obtain after n duplicate ACKS is used to set the slow start threshold. After ssthresh has been set, the congestion window is set equal to the slow start threshold only if it results cwin>ssthresh. In other words during slow start we do not speed up the increasing of cwin but we let it be exponential as in current TCP Reno. Function $f_2$ introduces one degree of freedom that we can use to tune the algorithm. We choose $f_1(\cdot)=f_2(\cdot)=\max(2,BWE*RTT_{min})$.

The algorithm after coarse timeout expiration is:

```
After timeout expiration
    if (cwin>ssthresh) /* congestion avoidance phase*/
        ssthresh= f₃(BWE* RTTmin)
            if (ssthresh < 2) ssthresh = 2;
            cwnd = 1 (or cwnd=2);
            else
            cwnd= f₄(BWE* RTTmin)
            endif
    endif
    if (cwin<ssthresh) /* slow start phase*/
        ssthresh= f₅(BWE* RTTmin)
            if (ssthresh < 2) ssthresh = 2;
            cwnd = 1 (or cwnd=2);
            else
            cwnd = f₆(BWE* RTTmin)
            end if
    end if
```

The rationale of the algorithm is again simple. After a timeout the conw and the ssthresh are set in according with one of the functions $f_i$ (i=3,6) of BWE*RTT$_{min}$ depending on the phase the algorithm was in when timeout was experienced.

Notice that using general functions $f_i$ (i=1,6) gives six degree of freedom to tune the algorithm.

One of the possible implementation is obtained choosing very simple functions $f_i$.

Algorithm After 3 Duplicate ACKS

```
After 3DUPACKS
ssthresh= (int)((current_bwe_/size_/8) * RTT_min);
if (ssthresh < 2)
   ssthresh = 2;
endif
/* during slow start we do not increase CWIN if it is smaller
than ssthresh */
if (cwnd> ssthresh)
   cwnd= ssthresh;
end if
```

As can be viewed by the code, the function $f_1$ which is used to set ssthresh when 3 DUPACK are received during congestion avoidance, is simply chosen as an identity function $f_1(x)=x$.

Algorithm After Timeout Expiration

```
After TIMEOUT:
ssthresh_= (int)((current_bwe_/size_/8) * RTT_min);
if (ssthresh < 2)
   ssthresh = 2;
endif
cwnd = 1 or cwnd=sstresh;
```

The function $f_1$ can be tuned in little different ways. However the essence of the tuning is that the control window cwnd and ssthresh are set equal to the estimated bandwidth BWE times the minimum RTT.

The invented bandwidth estimation algorithm is the best candidate to take full advantage of Active Management Queue algorithms such as Random Early Discard (RED) or weighted (WRED). In fact, using active droppers or markers, it is possible to allocate available bandwidth to different flows in according to specified policies. It is clear that BWE estimation allows a TCP connection to easily track the bandwidth allocated to the connection by the droppers.

Figure 5:
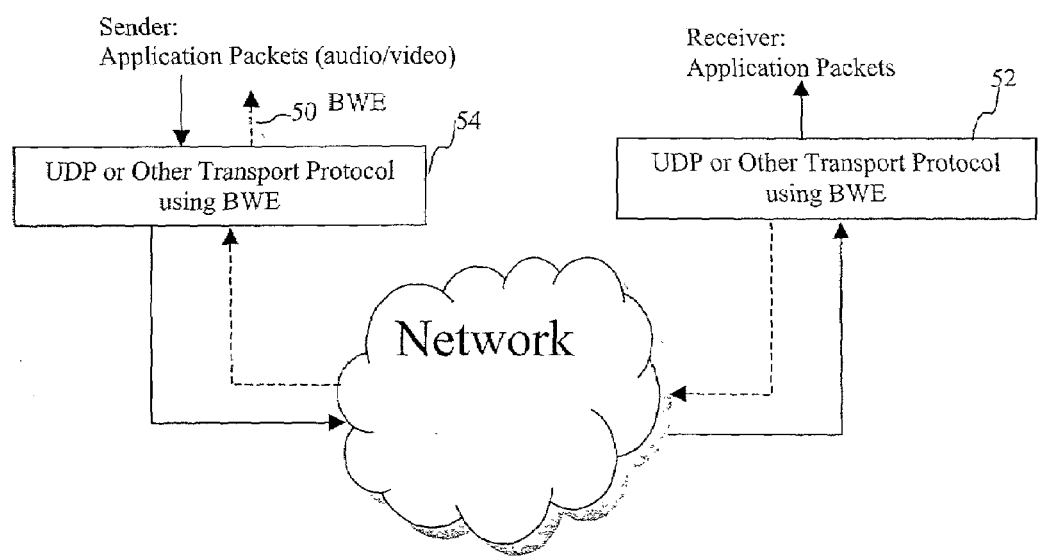
FIG. 5 is a representation of the bandwidth estimation algorithm implemented at the receiver or at the sender side of a UDP connection.

The same algorithm of bandwidth estimation is proposed to enhance the delivery of packets over the UDP protocol. Examples are video and audio (real-time) streams over UDP or over other protocols such as the Real Time Protocol (RTP) as it is shown in FIG. 5. In FIG. 5 the algorithm 52 of bandwidth estimation described above is executed at the receiver. The bandwidth estimate BWE is sent to the application 50 using control packets. The application utilizes the BWE to implement adaptive coding that takes into account available bandwidth. In this case the BWE information is used to choose a corresponding level of quality for the coding of audio or video signals. For example the application can utilizes layering coding and can send over the UDP protocol 54 the number of layers that are allowed by the estimated available bandwidth. The source input rate follows a probing phase during which the rate is increased by following a staircase like function, that is, a step-by-step increment. Each step of the increment corresponds to an increment of the quality of coding, for instance it corresponds to transmit another layer of a layered coding. The amplitude of each step can be different and it depends on the particular coding technique that is used. The first value of the input rate on the staircase input rate function corresponds to the minimum bandwidth that is required to transmit the stream. For example, let $q_1, q_2, q_3, \ldots q_n$, be the input rates corresponding to different quality of coding, then the input rate starts from $q_1$ and is increased, step-by-step, each time an RTP control packet is received that confirm that there is no congestion. After that a congestion episode is signaled by an RTP control packet, the input rate is set equal to the value $q_1$ that corresponds to the greatest quality of coding with a rate less than the estimated available bandwidth. The estimated bandwidth is computed at the receiver and sent back using RTP control packets. After this setting the increasing phase of the input rate is entered again through the steps $q_1$, $q_{i+1}$, in order to probe for extra available bandwidth. Notice that the increasing phase follows a step-by-step fashion, where the amplitude of the steps derives from the particular coding that is used.

The invention claimed is:

1. In an end-to-end estimation method of bandwidth available in a connection of a client and server established over a packet switching network, the improvements comprising:

computing in a first routine samples of the bandwidth available by taking into account a flow of data packets received by the client and time intervals during which the data packets are received if the routine is implemented at a receiver side of the client, or by taking into account acknowledgments or report packets received by a sender side of the server and time intervals during which acknowledgment or report packets are received if the routine is implemented at the sender side of the server;

computing in a second routine samples of available bandwidth as a ratio of an amount of received data packets over the time intervals during which the data packets are received if the routine is implemented at the receiver side of the client, or as a ratio of an amount of the data packets acknowledged over the time intervals during which the data packets are acknowledged if the routine is implemented at the sender side of the server; and implementing in a third routine a discrete time low-pass filter to obtain a filtered value of the samples of the available bandwidth, wherein a sample of the bandwidth available $b_j$ at a time $t_j$ is computed as:

$$b_j = \frac{d_j}{t_j - t_{j-1}}$$

where $d_j$ is the amount of the received data packets that have been received at the receiver side of the client or acknowledged at the sender side of the server in an interval $t_j-t_{j-1}$, $t_{j-1}$ is a time when a previous ACK or an ACK of one or more congestion windows of packets before were received by the sender side of the server or a time when a previous packet or a packet one or more congestion windows of packets before were received by the receiver side of the client, and $t_j$ is a time when a current ACK is received by the sender side of the server or when a current packet is received by the receiver side of the client, and wherein the available bandwidth samples are averaged using the discrete-time low-pass filter with time-varying coefficients:

$$\hat{b}_j = \frac{2\tau_f - \Delta_j}{2\tau_f + \Delta_j}\hat{b}_{j-1} + \Delta_j \frac{b_j + b_{j-1}}{2\tau_f + \Delta_j}$$

where $\bar{b}_j$ is the filtered measurement of the available bandwidth at time $t=t_j$, $\bar{b}_{j-1}$ is the filtered measurement of the available bandwidth at time $t_{j-1}$, $\Delta_j=t_j-t_{j-1}$, $1/\tau_f$ is the cut-off frequency of the filter, $b_j$ is the sample of the available bandwidth at time $t_j$, and $b_{j-1}$ is the sample of the available bandwidth at time $t_{j-1}$ if a time t/m (m≧2) has elapsed since the last received ACK or packet without receiving any new ACK or packet, then the filter assumes the reception of a virtual sample $b_j=0$.

2. Method for adaptively setting congestion window (cwnd) and slow start threshold (ssthresh) in the TCP/IP protocol comprising an end-to-end estimation method of bandwidth available in a connection of a client and server established over a packet switching network, the improvements comprising:

computing in a first routine samples of the bandwidth available by taking into account a flow of data packets received by the client and time intervals during which the data packets are received if the routine is implemented at a receiver side of the client, or by taking into account acknowledgments or report packets received by a sender side of the server and time intervals during which acknowledgment or report packets are received if the routine is implemented at the sender side of the server;

computing in a second routine samples of available bandwidth as a ratio of an amount of received data packets over the time intervals during which the data packets are received if the routine is implemented at the receiver side of the client or as a ratio of an amount of the data packets acknowledged over the time interval during which the data packets are acknowledged if the routine is implemented at the sender side of the server; and implementing in a third routine a discrete time low-pass filter to obtain a filtered value of the samples of the available bandwidth to set the windows as follows:

after a timeout: set ssthresh=min(2, BWE*RTTmin) set cwnd=2;

after 3 dupack: set ssthresh=min(2, BWE*RTTmin) set cwnd=ssthresh; and wherein RTT min is the minimum round trip time and BWE is the available bandwidth computed at the time of timeout or when 3 dupacks or n are received.

3. Method for adaptively selecting the quality of coding, or the numbers of layers to be transmitted in a layered coding of an audio/video source using the TCP protocol, or the UDP protocol or the RTP protocol, comprising:

a routine to compute an end-to-end estimation of the available band width according to claim 2;

a routine that selects the quality of coding, or the nuembers of layers to be transmitted in a layered coding of an audio/video so that the sending rate is the closer to the end-to-end bandwidth available estimate according to claim 2; and a routine to set TCP congestion window and slow start threshold according to claim 2 in order to send the coded audio/video source.

4. Method for adapting the amount of data for unit of time sent by the server to the client over a packet network, comprising an end-to-end bandwidth estimation comprising:

a routine to compute samples of available bandwidth by taking into account packets received by the client, if the routine is implemented at the receiver side, or by taking into account acknowledgment packets received by the sender, if the routine is implemented at the sender side; and a routine that implements a discrete time low-pass filter to obtain a filtered value of the samples of available bandwidth, wherein the low pass filter is a low pass filter according to claim 1.

5. Method for adaptively setting congestion window and slow start threshold in the TCP/IP protocol comprising an end-to-end bandwidth estimation comprising:

a routine to compute samples of available bandwidth by taking into account packets received by the client, if the routine is implemented at the receiver side, or by taking into account acknowledgment packets received by the sender, if the routine is implemented at the sender side; and a routine that implements a discrete time low-pass filter to obtain a filtered value of the samples of available bandwidth.

wherein the low-pass filter is a low-pass filter according to claim 1.

6. Method for adaptively selecting the quality of coding, or the numbers of layers to be transmitted in a layered coding of an audio/video source using the TCP protocol, or the UDP protocol or the RTP protocol comprising and end-to-end bandwidth estimation comprising:

a routine to compute samples of available bandwidth by taking into account packets received by the client, if the routine is implemented at the receiver side, or by taking into account acknowledgment packets received by the sender, if the routine is implemented at the sender side; and a routine that implements a discrete time low-pass filter to obtain a filtered value of the samples of available bandwidth over a packet network, comprising an end-to-end bandwidth, wherein the low-pass filter is a low-pass filter according to claim 1.

7. Method for adapting the amount of data for unit of time, i.e. the rate, sent by the server to the client over a packet network, comprising an end-to-end bandwidth estimation according to claim 1.

* * * * *